United States Patent
Bhavsar

(10) Patent No.: US 12,361,127 B1
(45) Date of Patent: Jul. 15, 2025

(54) COMPUTER-BASED SYSTEMS CONFIGURED FOR MALWARE DETECTION AND METHODS OF USE THEREOF

(71) Applicant: Go Daddy Operating Company, LLC, Tempe, AZ (US)

(72) Inventor: Kaushal Bhavsar, Gujarat (IN)

(73) Assignee: Go Daddy Operating Company, LLC, Tempe, AZ (US)

( * ) Notice: Subject to any disclaimer, the term of this patent is extended or adjusted under 35 U.S.C. 154(b) by 0 days.

(21) Appl. No.: 18/966,866

(22) Filed: Dec. 3, 2024

(51) Int. Cl.
*G06F 21/56* (2013.01)

(52) U.S. Cl.
CPC ........ *G06F 21/56* (2013.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 9,954,893 | B1 * | 4/2018 | Zhao | H04L 63/1466 |
| 2005/0273856 | A1 * | 12/2005 | Huddleston | G06F 21/566 |
| | | | | 726/22 |
| 2008/0114875 | A1 * | 5/2008 | Anastas | G06Q 30/02 |
| | | | | 709/224 |
| 2015/0156084 | A1 * | 6/2015 | Kaminsky | H04L 43/04 |
| | | | | 709/224 |
| 2017/0293477 | A1 * | 10/2017 | Takata | G06F 21/56 |
| 2021/0144174 | A1 * | 5/2021 | N | H04L 63/1483 |
| 2022/0027428 | A1 * | 1/2022 | Sutton | G06F 21/563 |

\* cited by examiner

*Primary Examiner* — Fatoumata Traore
(74) *Attorney, Agent, or Firm* — GREENBERG TRAURIG, LLP

(57) ABSTRACT

A method includes emulating a browser in cooperation with a browser controller for providing a controlled environment to safely execute a web program, loading a web page into the browser, injecting, by executing the browser controller, a first program into the loaded web page, capturing a first visual representation of a HTML element of the web page at a first time after the loading, executing the web page in the browser, logging, via the first program, an execution of a second program embedded in the web page, capturing a second visual representation of the HTML element at a second time later than the first time after the execution of the second program, comparing the first and second visual representation to detect a visual change, identifying the execution of the second program as a cause of the visual change, and performing a remedial action related to the web page in response.

17 Claims, 8 Drawing Sheets

400

| Time-stamp_1 | GET →                                                           410<br>https://xyz.com/assets/js/underscore.min.js<br>Referrer: https://xyz.com |

•
•
•

| Time-stamp_i | GET →                                               420<br>https://css.cdntoswitchspirit.com/scripts/class.js<br>Referrer: https://xyz.com |

•
•
•

| Time-stamp_n | GET →                                                   430<br>https://xyz.com/assets/js/wp-util.min.js<br>Referrer: https://xyz.com |

| Time-stamp_i | ⚡ addedNote                                                                                                          510 |
|              | `<script>var st = document.createElement('script'); st.innerHTML = atob("......)`<br>source: web-inspector://bootstrap.js:111:30 |
| Time-stamp_i | ⓘ info                                                                                                                520 |
|              | External script: https://css.cdntoswitchspirit.com/scripts/class.js |
| Time-stamp_i | ⓘ info                                                                                                                530 |
|              | [GET] https://css.cdntoswitchspirit.com/scripts/class.js |

FIG. 5

COMPUTER-BASED SYSTEMS CONFIGURED FOR MALWARE DETECTION AND METHODS OF USE THEREOF

FIELD OF TECHNOLOGY

The present disclosure generally relates to the field of computer security, and, more particularly, to computer-based systems configured for malware detection.

BACKGROUND OF TECHNOLOGY

Typically, a malware attack may be a type of cyberattack where malicious software, known as malware, is used to perform unauthorized actions on a victim's system. A malicious software can take many forms, including viruses, worms, trojan horses, spyware, rootkits, denial of service (DOS) attacks, or any form. Malware may be often installed on computers running browsers while communicating with malicious web site(s) that exploit browser vulnerability(ies). For example, an illustrative flaw may be either in the browser and/or in any other automatically launched external program(s) and/or extension(s) that may allow a malicious web page to install malware automatically when a user would visit the malicious web page, such that the user may not be aware of the installation. In one non-limiting example, the installed malware may enable a malware attacker to gain remote control over the compromised computer system and/or, in some cases, enable the malware attacker to steal sensitive information, send out spam, or install more malicious executable modules over time. Since web-based malware may target a large number of victims by compromising a single website, web-based malware typically may be a popular technique used by attackers at large.

Yet another illustrative problem with web-based malware may be that a bad actor may utilize web-based malware to generate resulting in hundreds of malicious scripts being generated every day. In another example, malware may need to be reverse-engineered to prepare one or more detection signatures based on one or more characteristics of the malware. In another example, a delay in generating one or more malware signatures may leave visitors open the infected web page and be vulnerable to attacks.

SUMMARY OF DESCRIBED SUBJECT MATTER

In some aspects, the techniques described herein relate to a method, including: emulating, by a computing device, a predetermined browser in cooperation with a browser controller for providing a controlled environment to execute at least one web program without harming the computing device; loading, by the computing device, at least one web page into the predetermined browser; injecting, by the computing device executing the browser controller, a first program into the loaded at least one web page; capturing, by the computing device, at least one first visual representation of at least one Hypertext Markup Language (HTML) element of the at least one web page at a first time after the loading; executing, by the computing device, the at least one web page in the predetermined browser; logging, by the computing device via the first program, an execution of a second program embedded in the at least one web page; capturing, by the computing device, at least one second visual representation of the at least one HTML element at a second time after the execution of the second program, the second time being later than the first time; comparing, by the computing device, the at least one first and second visual representation to detect at least one visual change therebetween; identifying, by the computing device, the execution of the second program as a cause of the at least one visual change; and performing, by the computing device, at least one remedial action related to the at least one web page in response to detecting the at least one visual change.

In some aspects, the techniques described herein relate to a method, where the first program is a monitoring program written in a scripting language to monitor events of the at least one web page.

In some aspects, the techniques described herein relate to a method, where the at least one web page's HTML is rendered, but a document object model (DOM) written in a scripting language is not loaded at the first time.

In some aspects, the techniques described herein relate to a method, where the second program is written in a scripting language and embedded in the at least one web page.

In some aspects, the techniques described herein relate to a method, where the at least one web page is fully loaded at the second time.

In some aspects, the techniques described herein relate to a method, where comparing the at least one first and second visual representation includes comparing HTML codes that render the at least one first and second visual representation.

In some aspects, the techniques described herein relate to a method, where the at least one first visual representation is a first image of the at least one web page captured at the first time and the at least one second visual representation is a second image of the at least one web captured at the second time.

In some aspects, the techniques described herein relate to a method, where detecting the at least one visual change includes loading the first and second image to a trained artificial intelligence model for detecting the at least one visual change.

In some aspects, the techniques described herein relate to a method, further including displaying the first image and the second image side-by-side in a window.

In some aspects, the techniques described herein relate to a method, further including logging, by the computing device, one or more web page events and one or more network events of the at least one web page, where the one or more web page events include actions that happen in the predetermined browser and the one or more network events include connection events and traffic events related to the at least one web page.

In some aspects, the techniques described herein relate to a method, further including displaying the one or more web page events and the one or more network events in a display window.

In some aspects, the techniques described herein relate to a method, further including displaying a network graph in the display window, where the network graph provides a visual representation of a structure of the at least one web page with corresponding URL and one or more hyperlinks.

In some aspects, the techniques described herein relate to a method, where the at least one remedial action includes blocking a public access of the at least one web page.

In some aspects, the techniques described herein relate to a system, including: at least one processor; and at least one memory storing a plurality of computing instructions configured to instruct the at least one processor to: emulate a predetermined browser in cooperation with a browser controller for providing a controlled environment to execute at least one web program without harming the system; load at least one web page into the predetermined browser; inject a first program into the loaded at least one web page; capture at least one first visual representation of at least one Hypertext Markup Language (HTML) element of the at least one web page at a first time after the loading; execute the at web page in the predetermined browser; log, via the first program, an execution of a second program embedded in the at least one web page; capture at least one second visual representation of the at least one HTML element at a second time after the execution of the second program, the second time being later than the first time; compare the at least one first and second visual representation to detect at least one visual change therebetween; identify the execution of the second program as a cause of the at least one visual change; and perform at least one remedial action related to the at least one web page in response to detecting the at least one visual change.

In some aspects, the techniques described herein relate to a system, where the first program is a monitoring program written in a scripting language to monitor events of the at least one web page.

In some aspects, the techniques described herein relate to a system, where the at least one web page's HTML is rendered, but a document object model (DOM) written in a scripting language is not loaded at the first time.

In some aspects, the techniques described herein relate to a system, where the at least one web page is fully loaded at the second time.

In some aspects, the techniques described herein relate to a system, where the at least one first visual representation is a first image of the at least one web page captured at the first time and the at least one second visual representation is a second image of the at least one web captured at the second time.

In some aspects, the techniques described herein relate to a system, where the computing instructions are further configured to instruct the at least one processor to display the first image and the second image side-by-side in a window.

In some aspects, the techniques described herein relate to a method, including: emulating, by a computing device, a predetermined browser in cooperation with a browser controller for providing a controlled environment to execute at least one web program without harming the computing device; loading, by the computing device, at least one web page into the predetermined browser; injecting, by the computing device executing the browser controller, a first program into the loaded web page; capturing, by the computing device, at least one first image of the at least one web page at a first time after the loading; executing, by the computing device, the at least one web page in the predetermined browser; logging, by the computing device via the first program, an execution of a second program embedded in the at least one web page; capturing, by the computing device, at least one second image of the at least one web page at a second time after the execution of the second program, the second time being later than the first time; comparing, by the computing device executing an artificial intelligent (AI) model, the at least one first and second image to detect at least one visual change therebetween; identifying, by the computing device, the execution of the second program as a cause of the at least one visual change; and performing, by the computing device, at least one remedial action related to the at least one web page in response to detecting the at least one visual change.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIG. 4 shows exemplary network requests generated when browsing a web page.

FIG. 5 shows an exemplary sequence of execution of a malware.

DETAILED DESCRIPTION

Figure 1:
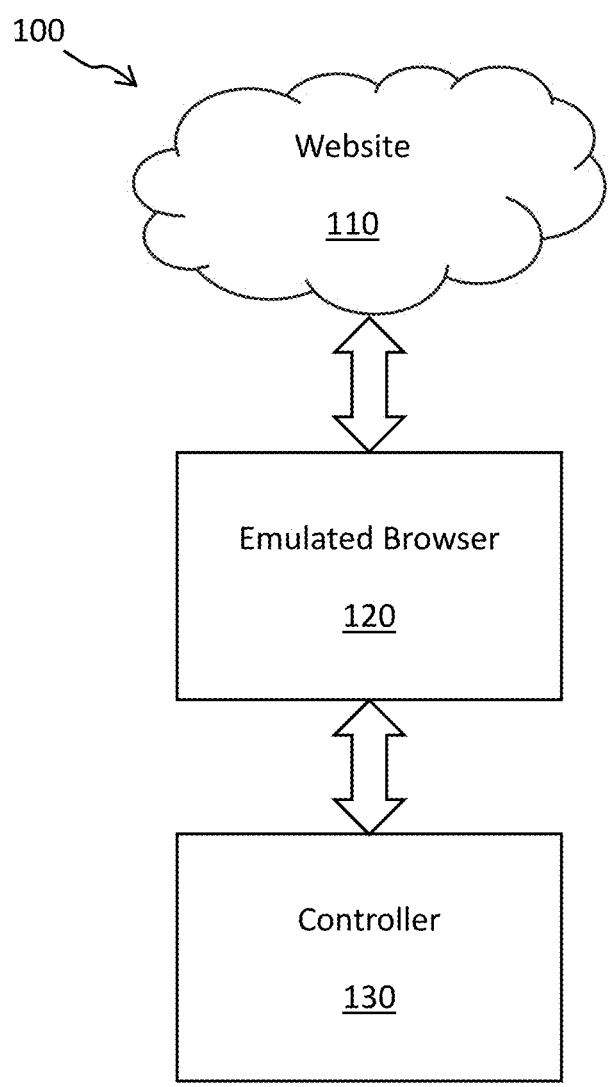
FIG. 1 is a block diagram illustrating an exemplary malware detection system in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in at least some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

The present disclosure relates to a system and accompanying method that detects malware in a website by detecting anomalies in behavior of the webpage while the website is being loaded into a controlled environment. The controlled environment includes a modern web browser such as Chromium, Firefox or Edge, with a browser controller. The controller environment allows programs from the website to execute normally, accessing any system resources it may need, while actively monitoring the program behavior.

Once the browser accesses the web page, the browser controller takes screenshots of the loaded web page at different time for visual comparison. For example, a first screenshot may be taken when the web page is initially loaded, and a second screenshot may be taken when the web page is fully loaded. The browser controller compares the first and second screenshot to identify visual manipulations in the web page by a malware.

The browser controller also injects a "proxy script" into the web page. The proxy script intercepts any scripting-language-program events that are executed by the web page and sends them to the browser controller that can log those events or neutralize them in case it finds them malicious. In addition, the browser controller logs all HTTP requests sent and received from the website to identify content being loaded from external locations.

FIG. 1 is a block diagram illustrating an exemplary malware detection system 100 in accordance with one or more embodiments of the present disclosure. The malware detection system 100 includes an emulated browser 120 for safely excessing a website 110 that may be infected with malware. The emulated browser 120 is controlled by a controller 130 to perform malware detection.

In at least some embodiments, the website 110 is a collection of interconnected web pages that are hosted by a server entity and typically accessed by client computing devices via the internet. The website 110 may be infected with malware due to software vulnerabilities, malicious third-party components, cross-site contamination, social engineering, malicious redirects and drive-by downloads, etc. Outdated software, plugins, or themes can have security flaws that hackers may exploit to inject malware. Using pirated or tampered third-party components can introduce backdoors to unwanted code into the website 110. If multiple websites share the same server, a compromised site can infect others on the same server. Hackers may trick webmasters into installing malware by disguising it as legitimate software or updates. Attackers can inject code that redirects visitors to malicious websites. Simply visiting an infected website can trigger automatic malware downloads.

In at least some embodiments, the emulated browser 120 is a software tool that mimics the functionality of a real web browser. The emulated browser 120 allows malware analysts to see how a website will look and behave across different browsers and devices without needing to have those browsers or devices physically available.

In at least some embodiments, the controller 130 may be a component within the emulated browser 120 that provides a web-based interface for choosing the website 110 to be browsed. The controller 130 may also facilitate a performance of at least one action so that the emulated browser 120 to simulate a browser for various device types, such as mobile phone, tablet, desktop or popular search engines. Once the choice of device type is made, a new browser session may be initiated, emulating the options selected using the default browser specified in the controller 130. The controller 130 together with the emulated browser 120 may form a controlled environment for safely detecting malware that may be present on the website 110.

In at least some embodiments, the controller 130 may allow at least one program from the accessed website to execute its normal flow, accessing any system resources, such as computer memory, processor, network connectivity, etc., it may need, while actively monitoring the at least one program's behavior. In some embodiments, one illustrative advantage of the controlled environment may be that such controlled environment may not be different from the target environment for which the malware would be created, and hence even if the malware would have a "sandbox detection" feature (malware can check for availability of key system resources, e.g., memory, CPU frequency and network address reachability, etc., to determine whether it is running in a sandbox or a real computer), the controlled environment may successfully provide the malware behavior profile while allowing the malware to execute "normally"—i.e., without being alerted that malware has been detected.

Malwares can harm a computing system (device) in various ways, such as data theft, system corruption, performance degradation, unauthorized access, and hardware damage. The data theft may refer to malware stealing sensitive information leading to identity theft and financial loss. Such sensitive information may include passwords, credit card numbers, and personal data. The system corruption may refer to file corruption or deletion making the system unstable and causing data loss. The performance degradation may refer to significant system resources being consumed by malware, resulting in slow performance, frequent crashes, and unresponsive applications. The unauthorized access may refer to malware gaining control over a computer. The hardware damage may refer to physical damage to hardware components by overheating the components or correcting firmware. The controlled environment according to embodiments of the present disclosure can allow web programs, including malwares, to execute in the emulated browser without harming the computing system (device).

In at least some embodiments, the controller 130 (also may be called herein as a "browser manager") may be a program that provides an interface for the malware analyst to choose an appropriate browser for the website 110 to execute in the controlled environment.

Figure 2:
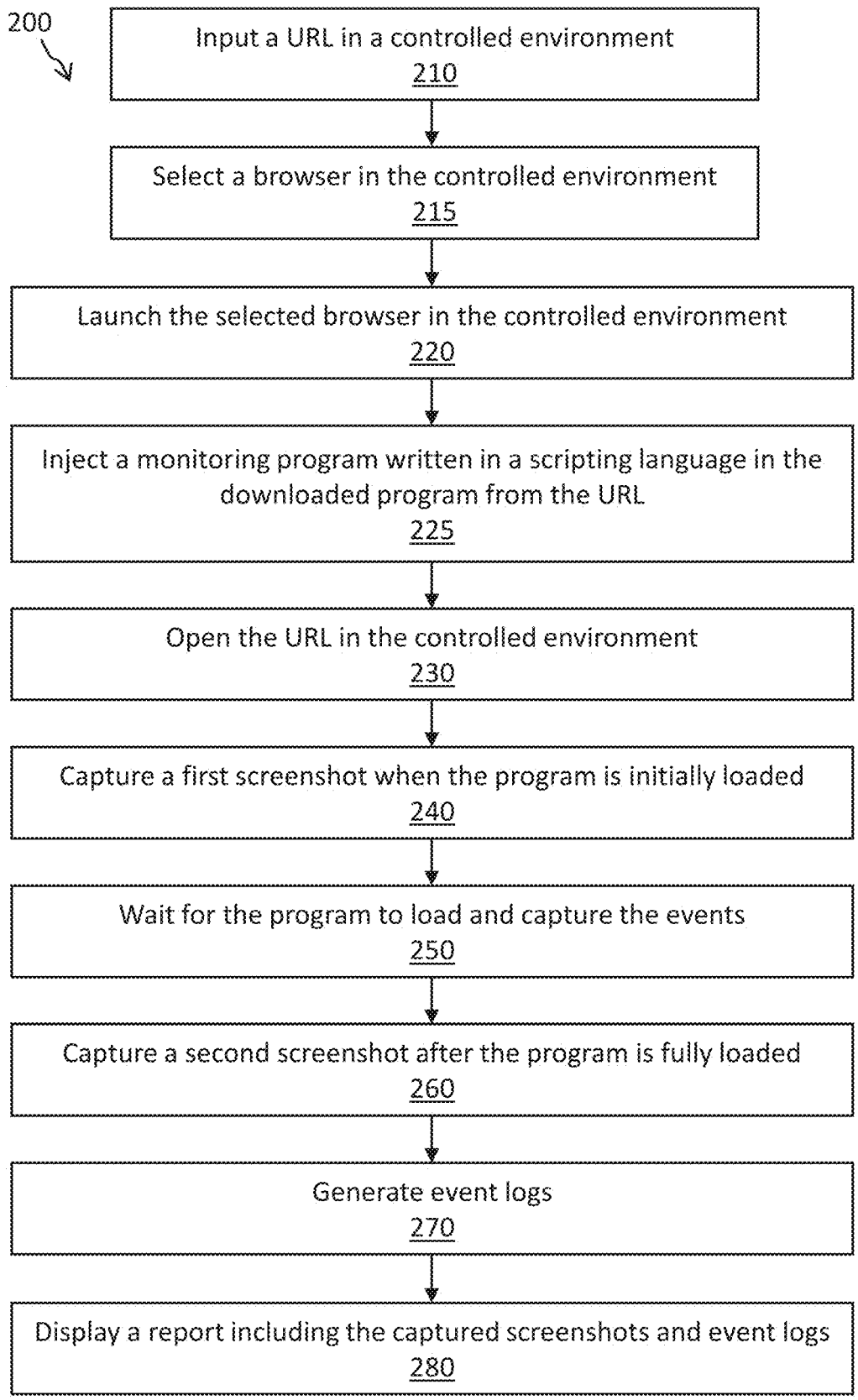
FIG. 2 is a flowchart illustrating an exemplary process for detecting malware in accordance with one or more embodiments of the present disclosure.

FIG. 2 is a flowchart illustrating an exemplary process 200 for detecting malware in accordance with one or more embodiments of the present disclosure. The process 200 may include exemplary blocks 210-280 as described herein below.

In block 210, the process 200 may input a uniform resource locator (URL) of a suspected website in a controlled environment. The controlled environment may exemplarily formed by the emulated browser 120 and the controller 130 shown in FIG. 1.

In block 215, the process 200 may select a browser in the controlled environment. In at least some embodiments, the selected browser may be predetermined by the controller 130 based on a targeted browser and device. In at least some embodiments, the process 200 may be programmed to perform on various browsers one by one.

In block 220, the process 200 may launch the selected browser in the controlled environment, i.e., loading programs from the suspected website. In at least some embodiments, the launched browser may have empty cache and/or local storage, so that previous browsing history may not affect current browsing session. In at least some embodiments, the controlled environment may allow the suspected website to execute normally, so that the controlled environment may not be detected by malicious program potentially contained in the suspected website.

In block 225, the process 200 may inject at least one monitoring program in the downloaded program from the suspected website. In at least some embodiments, the monitoring program may be written in a scripting language to perform various functions, e.g., behavioral analysis, network activity tracking, heuristic analysis, process monitoring and signature-based detection. The behavioral analysis may observe the behavior of applications, services, and files in real-time to detect any suspicious activities. Such observation may include monitoring for unusual changes in system files, registry entries, and processes. The network activity tracking may track network traffic to identify any unauthorized communication attempts or data exfiltration, which can indicate the presence of malware. The heuristic analysis may involve using algorithms to detect new, previously unknown malware by analyzing the characteristics and behavior patterns of files. The process monitoring may keep an eye on running processes to detect any that are behaving abnormally or attempting to perform unauthorized actions. The signature-based detection may involve comparing files against a database of known malware signatures to identify threats.

In block 230, the process 200 may open the URL in the controlled environment to allow the suspected website to start downloading.

In block 240, the process 200 may capture a first screenshot of the web page when the program is initially loaded. In at least some embodiments, the first screenshot may be captured when the web page's Hypertext Markup Language (HTML) is rendered, but the document object model (DOM) written in a scripting language is not loaded. In many cases, JavaScript malware may change in the website's HTML structure by inserting ads, popups or redirections. These changes may happen after the DOM is completely loaded. In at least some embodiments, the capturing screenshot of a website can be done with a programming language such as a scripting language. There are several libraries and tools available for this purpose.

In block 250, the process 250 may wait for the program for the suspected website to load and capture the events occurred during the loading. In at least some embodiments, the controller 130 may identify time-based conditional events in the web page and waits for them to complete, so that the web page is fully loaded. In at least some embodiments, the events may be captured with the injected monitoring program in above block 225.

In block 260, the process 200 may exemplarily capture a second screenshot after the program is loaded. In at least some embodiments, the loaded program may at least include the DOM written in a scripting language that may be used by a malware to change the web page's HTML structure. In at least some embodiments, the second screenshot may be captured after the program may be fully loaded.

In at least some embodiments, the second screenshot may be compared with the first screenshot to identify any change therebetween. A change between the two screenshot may indicate that the suspected website may be infected with malware that has been activated during the loading and altered the display of the website. In at least some embodiments, the first and second screenshot may be compared visually by an image recognition program.

In block 270, the process 200 generates event logs for the website loading process.

In block 280, the process 200 may display a report including the captured first and second screenshots and the event logs. The report may be used by a malware analyst to detect and identify potential malware in the suspected website.

Figure 3:
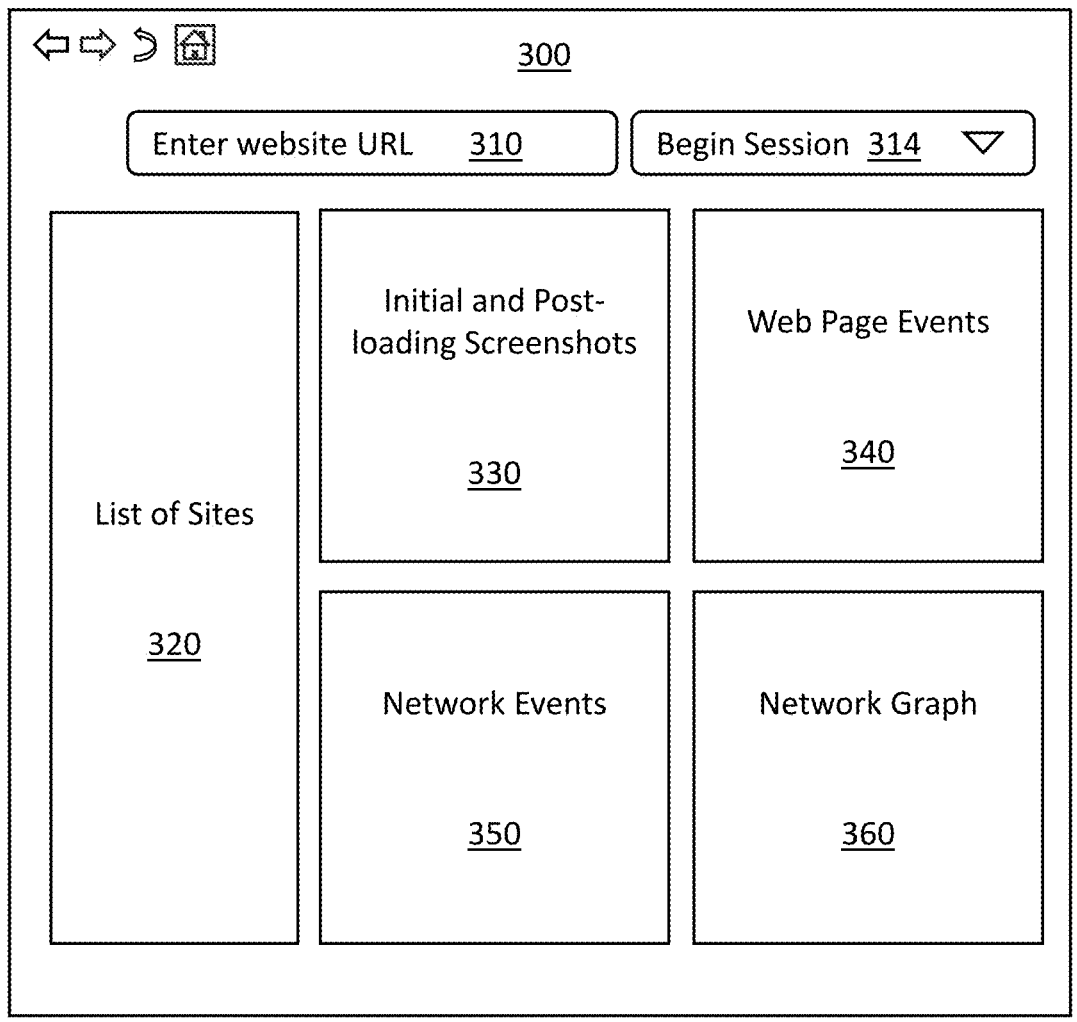
FIG. 3 is a block diagram illustrating an exemplary reporting interface in accordance with one or more embodiments of the present disclosure.

FIG. 3 is a block diagram illustrating an exemplary reporting interface 300 generated in block 280 of FIG. 2 in accordance with one or more embodiments of the present disclosure. In at least some embodiments, the browser controller 130 generates the reporting interface 300 to provide an insight into the series of events related to the web page to facilitate the malware detection. The reporting interface 300 can highlight anomalies in web page behavior.

As shown in FIG. 3, the reporting interface 300 may exemplarily include at least one text box 310, at least one selection button 314 and various panels 320-360 in a display window. A user may enter a website URL to visit in the text box 310. The selection button 314 may allow the user to select a browser for accessing the website and initiate a browsing session. The panels 320-360 may display status and events happening during the browsing session.

As shown in FIG. 3, the panel 320 may list websites the user such as the malware analyst visited in previous sessions. The list can be particularly useful for malware analysts to in behavioral analysis, incident response, research continuity, reference material and audit trail, etc. The behavioral analysis can help in understanding the browsing patterns and behaviors, which can be crucial for identifying suspicious activities or anomalies. The incident response can provide a timeline of events leading up to a security incident, aiding in the investigation and response process. The research continuity may allow the malware analysts to easily return to previously visited sites for further investigation or to gather more information. The reference material may act as a reference log for websites that contain valuable information, or tools used during analysis. The audit trails may maintain a record of visited websites for compliance and auditing purposes, ensuring that all activities are documented.

As shown in FIG. 3, the panel 330 may display the initial screenshot alongside the post-loading screenshot for a visual comparison. The screenshot of a webpage may refer to an image of the web page as displayed in the browser. In at least some embodiments, the initial screenshot and the post-loading screenshot may be displayed side-by-side, thus the panel 330 may provide an unbiased visualization of the elements on the web page. Comparing the initial (pre-scripting-language-program) screenshot with the post-loading (post-scripting-language-program) screenshot helps the analyst to identify any visual changes introduced on the web page after the JavaScript execution. This may facilitate diagnosing and provides evidence of malicious web elements for the selected browser.

As shown in FIG. 3, the panel 340 may display web page events occurred during the session. The web page events may be actions or occurrences that happen in the browser. These events can be triggered by user interactions such as click, hover and key press, or by the browser itself such as page loading and window resizing. In at least some embodiments, the web page events show the timeline of scripting-language-program events like manipulations in the document object model (DOM), connectivity to external internet addresses, manipulation of the cookies or local storage, accessing the system clipboard, and many such events.

As shown in FIG. 3, the panel 350 may display network events occurred during the session. The network events may refer to various activities or occurrences within the computer network that can be monitored, logged, and analyzed. Some common types of the network events may include connection events, traffic events, security events, performance events and hardware events. The connection events may include login/logout, connection establishment and disconnection. The traffic events may include data transfer and bandwidth usage. The security events may include unauthorized access attempt, malware detection and intrusion detection. The performance events may include latency issues, packet loss and network congestion. The hardware events may include device failures and configuration changes. Monitoring these events may help network administrators ensure the network operates smoothly and securely.

In at least some embodiments, the panel 350 may show a timeline of each network request made by the web page highlighting external addresses.

As shown in FIG. 3, the panel 360 may display a network graph relevant to the web session. The network graph, or web graph, may be a visual representation of the structure of the web. It may show nodes (or vertices) representing web pages with URL, and directed edges (or arcs) representing hyperlinks from one web page to another. In at least some embodiments, the network graph may highlight the relationships between the external addresses contacted by the web page, and with the web page itself.

FIG. 4 shows exemplary network requests 400 generated when browsing a web page. In at least some embodiments, the network requests 400 may be displayed in panel 350 (network events) shown in FIG. 3. As shown in FIG. 4, at both time-stamp_1 and time-stamp_n, the network requests (GET) access internal resources withing a fictitious website: xyz.com shown in blocks 410 (https://xyz.com/assets/js/underscore.min.js) and 430 (https://xyz.com/assets/js/wp-util.min.js). However, at time-stamp_i, the network request accesses an external resource outside of xyz.com shown in block 420 (https://css.cdntoswitchspirit.com/scripts/class.js). This outside resource shown in block 420 may be a malicious resource.

FIG. 5 shows an exemplary sequence of execution 500 of a malware. Block 510 may show that the process 200 shown in FIG. 2 has detected that a new scripting-language-program element was added to the web page. The added scripting-language-program may have come from the website's source files or even database, but it may be executed only after it is loaded on the web page. Block 520 may show that the added scripting-language-program may be obfuscated, but the process 200 may not make any attempt to stop the execution or de-obfuscate the added scripting-language-program. The controlled environment according to embodiments of the present disclosure may simply log the execution steps shown in blocks 520 and 530, as an external scripting-language-program may be called and executed into the browser resulting in a malicious redirecting.

In at least some embodiments, the analyst can also open the same web address while selecting a different browser, and the execution process 200 remains the same. The controlled environment according to embodiments of the present disclosure may not need to be reset for a new execution.

Figure 6:
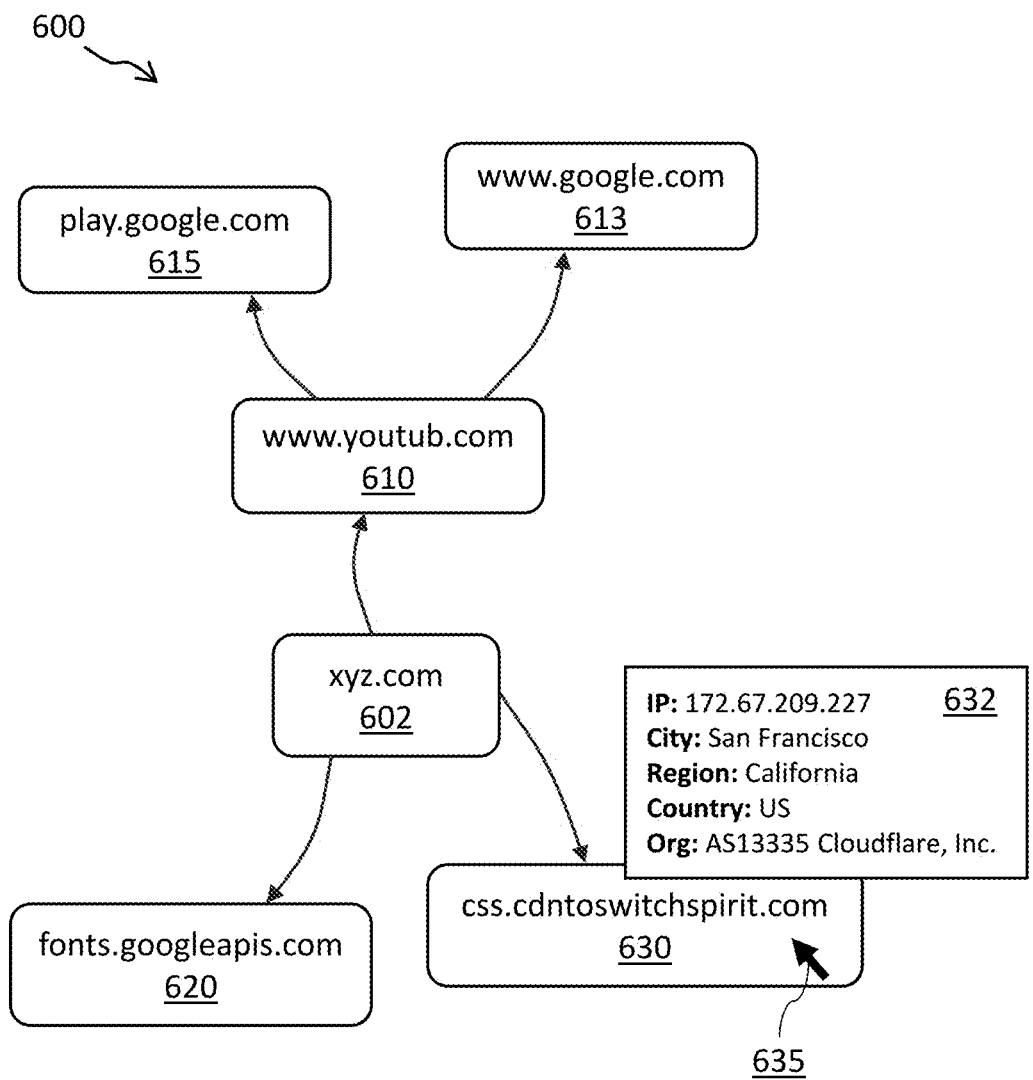
FIG. 6 shows an exemplary network graph.

FIG. 6 shows an exemplary network graph 600. Here, xyz.com may be an original URL for a website that the malware detection system 100 shown in FIG. 1 may request the emulated browser 120 to open. The URL may be visible in a central node 602 in the network graph 600.

The website may exemplarily load resources from a known domain, www.youtube.com, at a node 610, which in turn may exemplarily load resources from known domains, play.google.com and www.google.com, at nodes 615 and 613, respectively. The website may also exemplarily load a resource from another known domain, fonts.googleapis.com, at node 620. However, as shown in FIG. 6, the website may exemplarily load a resource from an unknown domain, css.cdntoswitchspirit.com, at node 630. When a mouse 635 may exemplarily hover on the node 630, internet protocol (IP) information for the domain at node 630 may pop up in box 632. As shown in FIG. 6, the network graph 600 may help visualized associations of domains and resources by drawing a connection between two domains.

Figure 7:
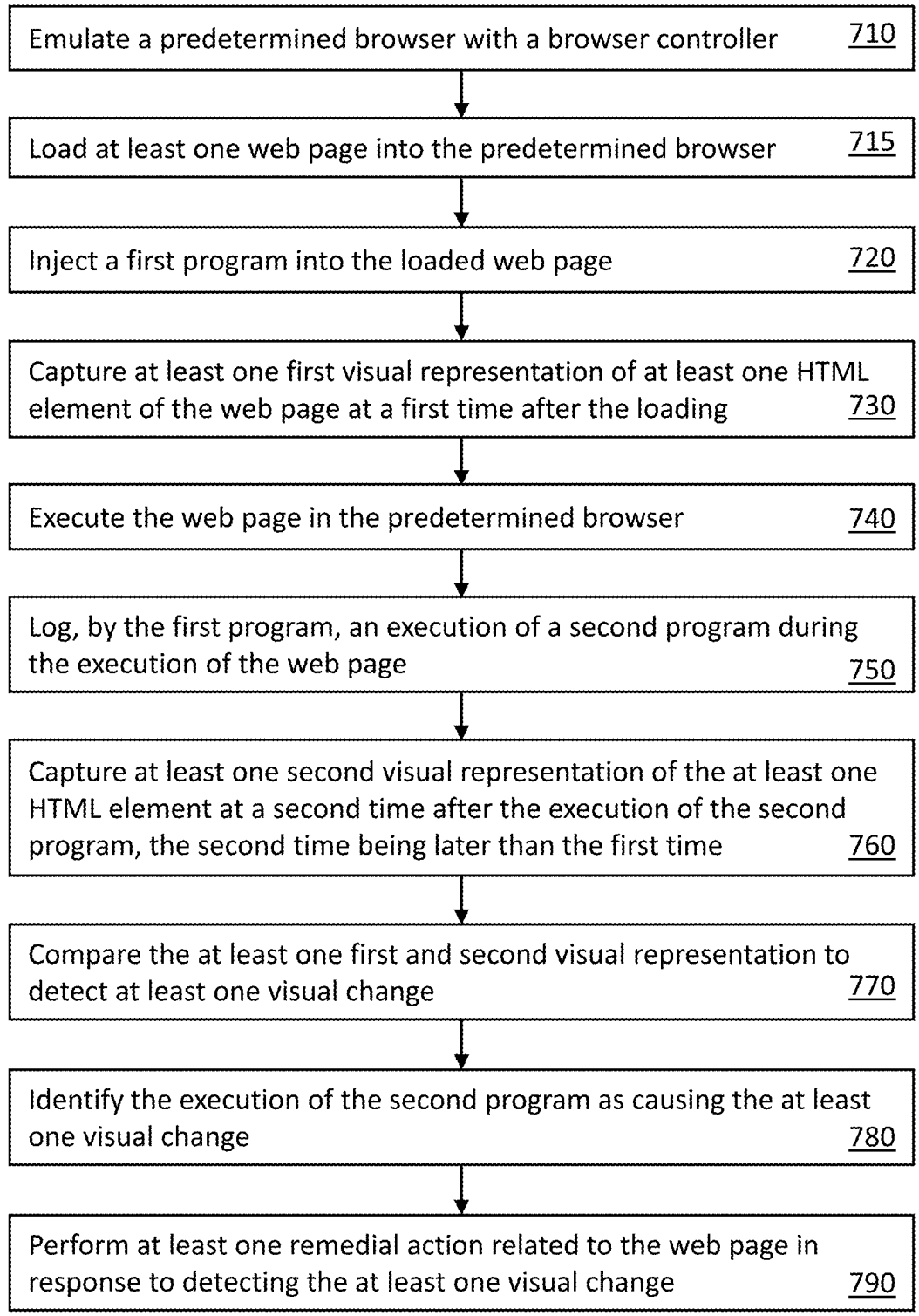
FIG. 7 is a flowchart illustrating an exemplary malware detection process in accordance with one or more embodiments of the present disclosure.

FIG. 7 is a flowchart illustrating an exemplary malware detection process 700 in accordance with one or more embodiments of the present disclosure. The malware detection process 700 may include operations by at least one computing device executing the emulated browser 120 and the browser controller 130 as shown in FIG. 1. The computing device operations may be exemplarily depicted in blocks 710-780 as described herein below.

In block 710, the computing device may emulate a predetermined browser 120 in cooperation with the browser controller 130 for providing a controlled environment to execute web programs without harming the computing device.

In block 715, the computing device may load at least one web page into the predetermined browser 120. The at least one web page may be a target web page for malware detection.

In block 720, the computing device may inject a first program into the loaded web page. In at least some embodiments, the first program may be a monitoring program written in a scripting language.

In block 730, the computing device may capture at least one first visual representation of at least one HTML element of the web page at a first time after the loading of the web page.

In block 740, the computing device may execute the web page in the predetermined browser.

In block 750, the computing device may log, by the first program, an execution of a second program during the execution of the web page. In at least some embodiments, the second program may be a malicious program written in a scripting language embedded in the web page. Upon execution, the second program may change the HTML structure of the web page. For example, a malicious program may load unintended content such as advertisements to the web page.

In block 760, the computing device may capture at least one second visual representation of the at least one HTML element at a second time after the execution of the second program, the second time being later than the first time. The second program may be malicious in nature and upon execution may change the at least one HTML element.

In block 770, the computing device may compare the at least one first and second visual representation to detect at least one visual change. In at least some embodiments, the at least one visual change can be detected by analyzing the codes of the at least one HTML element. The monitoring program injected in the web page may exemplarily analyze the codes at the first and codes at the second time to detect any change therebetween.

In at least some embodiments, the at least one first and second visual representation may be images of the web page taken at the first time and second time, respectively. In this case, artificial intelligence (AI) may be employed in detecting the visual changes (change detection). AI models, such as convolutional neural networks (CNNs) and transformer-based networks, can be exemplarily used for these tasks. The AI models may be first trained with various web images. Such a trained AI model may then be deployed for the visual change detection.

In at least some embodiments, training an AI model for change detection may involve data collection, data preprocessing, labeling, model selection, training and evaluation.

In at least some embodiments, the data collection for the AI model training may include gathering images of web pages from various websites and from different time, so that the AI model can be trained to recognize common features of web pages.

In at least some embodiments, the data preprocessing for the AI model training may include aligning and normalizing the gathered images to ensure they are comparable. This may involve resizing.

In at least some embodiments, the labeling for the AI model training may include annotating the images to highlight the areas of change. This step is crucial for supervised learning, where the model learns from labeled examples.

In at least some embodiments, the model selection for the AI model training may include choosing an appropriate model architecture. Convolutional Neural Networks (CNNs) may be commonly used for image-based tasks. More advanced architectures like U-Net or transformer-based models may also be considered for better performance.

In at least some embodiments, the training for the AI model training may include splitting the gathered image data into training and validation sets. Train the selected model using the training set and validate its performance on the validation set. Use techniques like data augmentation to improve the model's robustness.

In at least some embodiments, the evaluation for the AI model training may include evaluating the model's performance using metrics such as accuracy, precision, recall, and F1 score. Adjust the model parameters and retrain as necessary to improve performance.

Once the AI model performs satisfactorily, it can be deployed for detecting visual changes between the at least one first and second visual representation depicted in FIG. 7.

Using the trained AI model to detect visual changes may involve preparing an environment to run the trained AI model, preprocessing the input images and making predictions.

In at least some embodiments, preparing the environment ensures the necessary software and hardware. This typically includes a powerful computer with a GPU, and software frameworks like TensorFlow or PyTorch.

In at least some embodiments, preprocessing the input images may include preprocessing the captured images to match the input requirements of the AI model. This may involve resizing, normalizing, and converting the captured images to the appropriate format.

In at least some embodiments, the making predictions may include using the model to make predictions on the preprocessed images. This may typically output a set of probabilities or classifications indicating the detected visual changes.

In block 780, the computing device may identify the execution of the second program as causing the at least one visual change.

In block 790, the computing device may perform at least one remedial action related to the web page in response to detecting the at least one visual change. In at least some embodiments, as the execution of the second program may cause changes in the at least one first and second visual representation, the presence of the second program in the web page may be viewed as malicious. In this case, an exemplary remedial action may be to report the presence of malware in the web page to the website owner. Another exemplary remedial action may be to block public access of the website that contain the malware-infested web page.

Figure 8:
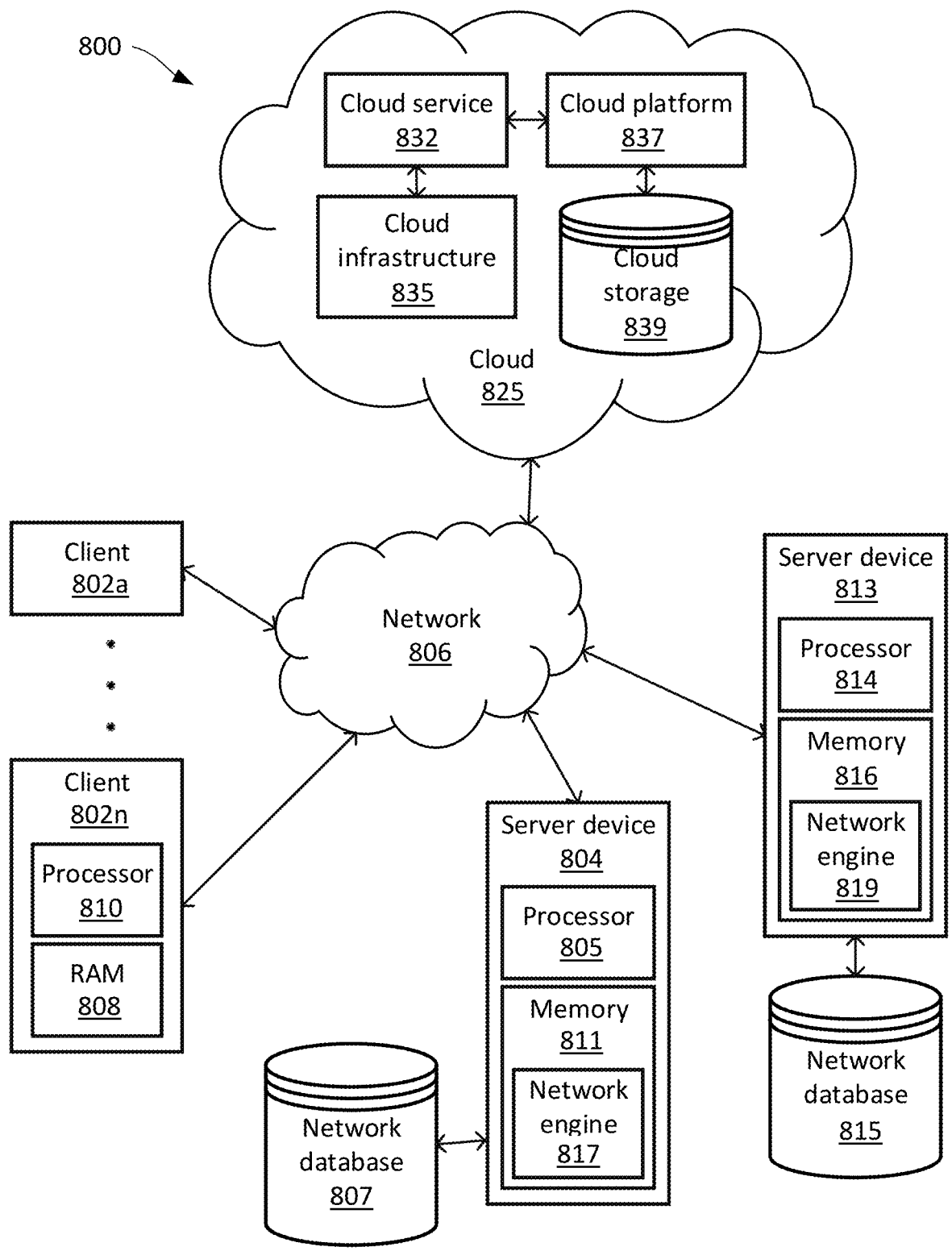
FIG. 8 is a block diagram illustrating an exemplary computer-based system/platform in accordance with one or more embodiments of the present disclosure.

FIG. 8 is a block diagram illustrating an exemplary computer-based system/platform 800 in accordance with one or more embodiments of the present disclosure. However, not all of these components may be required to practice one or more embodiments, and variations in the arrangement and type of the components may be made without departing from the spirit or scope of various embodiments of the present disclosure. In at least some embodiments, client computing devices 802a through 802n shown each at least includes a computer-readable medium, such as a random-access memory (RAM) 808 coupled to a processor 810 or FLASH memory (not shown) associated thereto. In at least some embodiments, processor 810 may execute computer-executable program instructions stored in memory 808. In at least some embodiments, processor 810 may include a microprocessor, an ASIC, and/or a state machine. In at least some embodiments, processor 810 may include, or may be in communication with, media, for example computer-readable media, which stores instructions that, when executed by processor 810, may cause processor 810 to perform one or more steps described herein. In at least some embodiments, examples of computer-readable media may include, but are not limited to, an electronic, optical, magnetic, or other storage or transmission device capable of providing a processor, such as the processor 810 of client 802a, with computer-readable instructions. In at least some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In at least some embodiments, the instructions may comprise code from any computer-programming language, including, for example, C, C++, Visual Basic, Java, Python, Perl, JavaScript, and etc.

In at least some embodiments, client computing devices 802a through 802n may also comprise a number of external or internal devices such as a mouse, a CD-ROM, DVD, a physical or virtual keyboard, a display, a speaker, or other input or output devices. In at least some embodiments, examples of client computing devices 802a through 802n (e.g., clients) may be any type of processor-based platforms that are connected to a network 806 such as, without limitation, personal computers, digital assistants, personal digital assistants, smart phones, pagers, digital tablets, laptop computers, Internet appliances, and other processor-based devices. In at least some embodiments, client computing devices 802a through 802n may be specifically programmed with one or more application programs in accordance with one or more principles/methodologies detailed herein. In at least some embodiments, client computing devices 802a through 802n may operate on any operating system capable of supporting a browser or browser-enabled application, such as Microsoft™, Windows™, and/or Linux. In at least some embodiments, client computing devices 802a through 802n shown may include, for example, personal computers executing a browser application program such as Microsoft Corporation's Internet Explorer™, Apple Computer, Inc.'s Safari™, Mozilla Firefox, and/or Opera. In at least some embodiments, through the client computing client devices 802a through 802n, users may communicate over exemplary network 806 with each other and/or with other systems and/or devices coupled to network 806.

As shown in FIG. 8, exemplary server devices 804 and 813 may be also coupled to network 506. Exemplary server device 804 may include a processor 805 coupled to a memory 811 that may store a network engine 817. Exemplary server device 813 may include a processor 814 coupled to a memory 816 that may store a network engine 819. In at least some embodiments, one or more client computing devices 802a through 802n may be mobile clients.

As shown in FIG. 8, exemplary server device 804 may be coupled to an exemplary network database 807; and exemplary server device 813 may be coupled to an exemplary network database 815. In at least some embodiments, exemplary databases 807 and 815 may be any type of database, including a database managed by a database management system (DBMS). In at least some embodiments, an exemplary DBMS-managed database may be specifically programmed as an engine that controls organization, storage, management, and/or retrieval of data in the respective database. In at least some embodiments, the exemplary DBMS-managed database may be specifically programmed to provide the ability to query, backup and replicate, enforce rules, provide security, compute, perform change and access logging, and/or automate optimization. In at least some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In at least some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In at least some embodiments, the exemplary DBMS-managed database may be specifically programmed to include metadata about the data that is stored.

As shown in FIG. 8, network 806 may be coupled to a cloud computing/architecture(s) 825. Cloud computing/architecture(s) 825 may include a cloud service 832 coupled to a cloud infrastructure 835 and a cloud platform 837, where the cloud platform 837 may be coupled to a cloud storage 839.

The computing system can also employ any number of software, firmware, and/or hardware configurations. For example, one or more of the example embodiments disclosed herein can be encoded as a computer program (also referred to as computer software, software applications, computer-readable instructions, and/or computer control logic) on a computer-readable medium.

The term "computer-readable medium," as used herein, can generally refer to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In at least some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment may be implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In at least some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In at least some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD, NetBSD, OpenBSD; (2) Linux; (3) Microsoft Windows; (4) OS X (MacOS); (5) MacOS 11; (6) Solaris; (7) Android; (8) iOS; (9) Embedded Linux; (10) Tizen; (11) WebOS; (12) IBM i; (13) IBM AIX; (14) Binary Runtime Environment for Wireless (BREW); (15) Cocoa (API); (16) Cocoa Touch; (17) Java Platforms; (18) JavaFX; (19) JavaFX Mobile; (20) Microsoft DirectX; (21).NET Framework; (22) Silverlight; (23) Open Web Platform; (24) Oracle Database; (25) Qt; (26) Eclipse Rich Client Platform; (27) SAP NetWeaver; (28) Smartface; and/or (29) Windows Runtime.

In at least some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In at least some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

The aforementioned examples are, of course, illustrative and not restrictive.

As used herein, the term "user" shall have a meaning of at least one user. In at least some embodiments, the terms "user", "subscriber" "consumer" or "customer" should be understood to refer to a user of an application or applications for implementing the functions of the CVCP as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

The aforementioned examples are, of course, illustrative and not restrictive.

In at least some embodiments, the exemplary inventive computer-based systems, the exemplary inventive computer-based devices, and/or the exemplary inventive computer-based components of the present disclosure may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In at least some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In at least some embodiments and, optionally, in combination of any embodiment described above or below, an exemplary implementation of Neural Network may be executed as follows:

i) Define Neural Network architecture/model,
ii) Transfer the input data to the exemplary neural network model,
iii) Train the exemplary model incrementally,
iv) determine the accuracy for a specific number of timesteps,
v) apply the exemplary trained model to process the newly-received input data,
vi) optionally and in parallel, continue to train the exemplary trained model with a predetermined periodicity.

In at least some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In at least some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node may be activated. In at least some embodiments and, optionally, in combination of any embodiment described above or below, the exemplary aggregation function may be a mathematical function that combines (e.g., sum, product, etc.) input signals to the node. In at least some embodiments and, optionally, in combination of any embodiment described above or below, an output of the exemplary aggregation function may be used as input to the exemplary activation function. In at least some embodiments and, optionally, in combination of any embodiment described above or below, the bias may be a constant value or function that may be used by the aggregation function and/or the activation function to make the node more or less likely to be activated.

The aforementioned examples are, of course, illustrative and not restrictive.

At least some aspects of the present disclosure will now be described with reference to the following numbered clauses.

Clause 1. A method, including: emulating, by a computing device, a predetermined browser in cooperation with a browser controller for providing a controlled environment to execute at least one web program without harming the computing device; loading, by the computing device, at least one web page into the predetermined browser; injecting, by the computing device executing the browser controller, a first program into the loaded at least one web page; capturing, by the computing device, at least one first visual representation of at least one Hypertext Markup Language (HTML) element of the at least one web page at a first time after the loading; executing, by the computing device, the at least one web page in the predetermined browser; logging, by the computing device via the first program, an execution of a second program embedded in the at least one web page; capturing, by the computing device, at least one second visual representation of the at least one HTML element at a second time after the execution of the second program, the second time being later than the first time; comparing, by the computing device, the at least one first and second visual representation to detect at least one visual change therebetween; identifying, by the computing device, the execution of the second program as a cause of the at least one visual change; and performing, by the computing device, at least one remedial action related to the at least one web page in response to detecting the at least one visual change.

Clause 2. The method of clause 1, where the first program is a monitoring program written in a scripting language to monitor events of the at least one web page.

Clause 3. The method of clause 1, where the at least one web page's HTML is rendered, but a document object model (DOM) written in a scripting language is not loaded at the first time.

Clause 4. The method of clause 1, where the second program is written in a scripting language and embedded in the at least one web page.

Clause 5. The method of clause 1, where the at least one web page is fully loaded at the second time.

Clause 6. The method of clause 1, where comparing the at least one first and second visual representation includes comparing HTML codes that render the at least one first and second visual representation.

Clause 7. The method of clause 1, where the at least one first visual representation is a first image of the at least one web page captured at the first time and the at least one second visual representation is a second image of the at least one web captured at the second time.

Clause 8. The method of clause 7, where detecting the at least one visual change includes loading the first and second image to a trained artificial intelligence model for detecting the at least one visual change.

Clause 9. The method of clause 7, further including displaying the first image and the second image side-by-side in a window.

Clause 10. The method of clause 1, further including logging, by the computing device, one or more web page events and one or more network events of the at least one web page, where the one or more web page events include actions that happen in the predetermined browser and the one or more network events include connection events and traffic events related to the at least one web page.

Clause 11. The method of clause 10, further including displaying the one or more web page events and the one or more network events in a display window.

Clause 12. The method of clause 11, further including displaying a network graph in the display window, where the network graph provides a visual representation of a structure of the at least one web page with corresponding URL and one or more hyperlinks.

Clause 13. The method of clause 1, where the at least one remedial action includes blocking a public access of the at least one web page.

Clause 14. A system, including: at least one processor; and at least one memory storing a plurality of computing instructions configured to instruct the at least one processor to: emulate a predetermined browser in cooperation with a browser controller for providing a controlled environment to execute at least one web program without harming the system; load at least one web page into the predetermined browser; inject a first program into the loaded at least one web page; capture at least one first visual representation of at least one Hypertext Markup Language (HTML) element of the at least one web page at a first time after the loading; execute the at web page in the predetermined browser; log, via the first program, an execution of a second program embedded in the at least one web page; capture at least one second visual representation of the at least one HTML element at a second time after the execution of the second program, the second time being later than the first time; compare the at least one first and second visual representation to detect at least one visual change therebetween; identify the execution of the second program as a cause of the at least one visual change; and perform at least one remedial action related to the at least one web page in response to detecting the at least one visual change.

Clause 15. The system of clause 14, where the first program is a monitoring program written in a scripting language to monitor events of the at least one web page.

Clause 16. The system of clause 14, where the at least one web page's HTML is rendered, but a document object model (DOM) written in a scripting language is not loaded at the first time.

Clause 17. The system of clause 14, where the at least one web page is fully loaded at the second time.

Clause 18. The system of clause 14, where the at least one first visual representation is a first image of the at least one web page captured at the first time and the at least one second visual representation is a second image of the at least one web captured at the second time.

Clause 19. The system of clause 18, where the computing instructions are further configured to instruct the at least one processor to display the first image and the second image side-by-side in a window.

Clause 20. A method, including: emulating, by a computing device, a predetermined browser in cooperation with a browser controller for providing a controlled environment to execute at least one web program without harming the computing device; loading, by the computing device, at least one web page into the predetermined browser; injecting, by the computing device executing the browser controller, a first program into the loaded web page; capturing, by the computing device, at least one first image of the at least one web page at a first time after the loading; executing, by the computing device, the at least one web page in the predetermined browser; logging, by the computing device via the first program, an execution of a second program embedded in the at least one web page; capturing, by the computing device, at least one second image of the at least one web page at a second time after the execution of the second program, the second time being later than the first time;
comparing, by the computing device executing an artificial intelligent (AI) model, the at least one first and second image to detect at least one visual change therebetween; identifying, by the computing device, the execution of the second program as a cause of the at least one visual change; and performing, by the computing device, at least one remedial action related to the at least one web page in response to detecting the at least one visual change.

Publications cited throughout this document are hereby incorporated by reference in their entirety. While one or more embodiments of the present disclosure have been described, it may be understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:

1. A method, comprising:
   emulating, by a computing device, a predetermined browser in cooperation with a browser controller for providing a controlled environment to execute at least one web program without harming the computing device;
   loading, by the computing device, at least one web page into the predetermined browser, wherein the web page is a target web page for malware detection;
   injecting, by the computing device executing the browser controller, a first program into the loaded at least one web page, the first program configured to monitor an execution of the at least one web page;
   capturing, by the computing device, at least one first visual representation of at least one graphical user interface element of the at least one web page at a first time after the loading;
   executing, by the computing device, the at least one web page in the predetermined browser;
   logging, by the computing device via the first program, an execution of a second program embedded in the at least one web page, wherein the second program is a malicious program written in in scripting language;
   capturing, by the computing device, at least one second visual representation of the at least one graphical user interface element at a second time after the execution of the second program, the second time being later than the first time;
   comparing, by the computing device, the at least one first and second visual representation to detect at least one visual change therebetween, wherein detecting the at least one visual change comprises loading the first and second image to a trained artificial intelligence model for detecting the at least one visual change;
   identifying, by the computing device, the execution of the second program as a cause of the at least one visual change; and
   performing, by the computing device, at least one remedial action related to the at least one web page in response to detecting the at least one visual change.

2. The system of claim 1, wherein the first program is a monitoring program written in a scripting language to monitor events of the at least one web page.

3. The method of claim 1, wherein the at least one web page's graphical user interface element is rendered, but a document object model (DOM) written in a scripting language is not loaded at the first time.

4. The method of claim 1, wherein the at least one web page is fully loaded at the second time.

5. The method of claim 1, wherein the at least one first visual representation is a first image of the at least one web page captured at the first time and the at least one second visual representation is a second image of the at least one web captured at the second time.

6. The method of claim 5, further comprising displaying the first image and the second image side-by-side in a window.

7. The method of claim 1, further comprising logging, by the computing device, one or more web page events and one or more network events of the at least one web page, wherein the one or more web page events comprise actions that happen in the predetermined browser and the one or more network events comprise connection events and traffic events related to the at least one web page.

8. The method of claim 7, further comprising displaying the one or more web page events and the one or more network events in a display window.

9. The method of claim 8, further comprising displaying a network graph in the display window, wherein the network graph provides a visual representation of a structure of the at least one web page with corresponding URL and one or more hyperlinks.

10. The method of claim 1, wherein the at least one remedial action comprises blocking a public access of the at least one web page.

11. A system, comprising:
    at least one processor; and
    at least one memory storing a plurality of computing instructions configured to instruct the at least one processor to:
    emulate a predetermined browser in cooperation with a browser controller for providing a controlled environment to execute at least one web program without harming the system;
    load at least one web page into the predetermined browser, wherein the web page is a target web page for malware detection;
    inject a first program into the loaded at least one web page, the first program configured to monitor an execution of the at least one web page;
    capture at least one first visual representation of at least one graphical user interface element of the at least one web page at a first time after the loading;
    execute the at least one web page in the predetermined browser;
    logging, via the first program, an execution of a second program embedded in the at least one web page, wherein the second program is a malicious program written in in scripting language;
    capture at least one second visual representation of the at least one graphical user interface element at a second time after the execution of the second program, the second time being later than the first time;
    compare the at least one first and second visual representation to detect at least one visual change therebetween, wherein detecting the at least one visual change comprises loading the first and second image to a trained artificial intelligence model for detecting the at least one visual change;

identify the execution of the second program as a cause of the at least one visual change; and perform at least one remedial action related to the at least one web page in response to detecting the at least one visual change.

12. The system of claim 11, wherein the first program is a monitoring program written in a scripting language to monitor events of the at least one web page.

13. The system of claim 11, wherein the at least one web page's graphical user interface element is rendered, but a document object model (DOM) written in a scripting language is not loaded at the first time.

14. The system of claim 11, wherein the at least one web page is fully loaded at the second time.

15. The system of claim 11, wherein the at least one first visual representation is a first image of the at least one web page captured at the first time and the at least one second visual representation is a second image of the at least one web captured at the second time.

16. The system of claim 15, wherein the computing instructions are further configured to instruct the at least one processor to display the first image and the second image side-by-side in a window.

17. A method, comprising:

emulating, by a computing device, a predetermined browser in cooperation with a browser controller for providing a controlled environment to execute at least one web program without harming the computing device;

loading, by the computing device, at least one web page into the predetermined browser, wherein the web page is a target web page for malware detection;

injecting, by the computing device executing the browser controller, a first program into the loaded web page, the first program configured to monitor an execution of the at least one web page;

capturing, by the computing device, at least one first image of the at least one web page at a first time after the loading;

executing, by the computing device, the at least one web page in the predetermined browser;

logging, by the computing device via the first program, an execution of a second program embedded in the at least one web page, wherein the second program is a malicious program written in in scripting language;

capturing, by the computing device, at least one second image of the at least one web page at a second time after the execution of the second program, the second time being later than the first time;

comparing, by the computing device executing an artificial intelligent (AI) model, the at least one first and second image to detect at least one visual change therebetween, wherein detecting the at least one visual change comprises loading the first and second image to the AI model for detecting the at least one visual change;

identifying, by the computing device, the execution of the second program as a cause of the at least one visual change; and performing, by the computing device, at least one remedial action related to the at least one web page in response to detecting the at least one visual change.

\* \* \* \* \*